United States Patent
Yamane et al.

(10) Patent No.: US 9,386,394 B2
(45) Date of Patent: Jul. 5, 2016

(54) MOBILE COMMUNICATION TERMINAL AND TERMINAL CONTROL METHOD

(75) Inventors: Takahiro Yamane, Chiyoda-ku (JP); Kazufumi Yunoki, Chiyoda-ku (JP); Takehiro Ida, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 168 days.

(21) Appl. No.: 13/820,755

(22) PCT Filed: Sep. 12, 2011

(86) PCT No.: PCT/JP2011/070759
§ 371 (c)(1),
(2), (4) Date: Mar. 5, 2013

(87) PCT Pub. No.: WO2012/056819
PCT Pub. Date: May 3, 2012

(65) Prior Publication Data
US 2013/0165102 A1    Jun. 27, 2013

(30) Foreign Application Priority Data
Oct. 27, 2010  (JP) .................................. 2010-240549

(51) Int. Cl.
*H04W 4/00* (2009.01)
*H04L 29/08* (2006.01)
(Continued)

(52) U.S. Cl.
CPC ............... *H04W 4/001* (2013.01); *H04L 69/32* (2013.01); *H04W 4/003* (2013.01); *H04M 1/72569* (2013.01); *H04M 1/72597* (2013.01); *H04W 60/00* (2013.01)

(58) Field of Classification Search
CPC ..... H04W 60/00; H04W 36/14; H04W 48/18; H04W 4/001; H04W 4/003; H04W 4/00; H04W 4/02; G06Q 20/32; H04M 1/72597
USPC .................................. 370/828; 455/418, 512
See application file for complete search history.

(56) References Cited

U.S. PATENT DOCUMENTS

2002/0087674 A1* 7/2002 Guilford et al. ............... 709/223
2008/0311912 A1* 12/2008 Balasubramanian . H04W 48/18
                                                                455/436
(Continued)

FOREIGN PATENT DOCUMENTS

JP    2006 279160    10/2006
JP    2008 271121    11/2008
(Continued)

OTHER PUBLICATIONS

International Preliminary Report on Patentability issued May 23, 2013, in PCT/JP2011/070759, filed Sep. 12, 2011.
(Continued)

*Primary Examiner* — Kashif Siddiqui
*Assistant Examiner* — Minjung Kim
(74) *Attorney, Agent, or Firm* — Oblon, McClelland, Maier & Neustadt, L.L.P.

(57) ABSTRACT

Execution of an application that functions when a mobile communication terminal is performing communication in a particular mobile communication network. A mobile communication terminal includes an application execution unit for executing one or more applications, a mobile communication unit for performing location registration in a mobile communication network for establishing a communication state, a communication network specifying unit for specifying the mobile communication network in which location registration is made, and an application control unit for performing control on the application execution unit so as to start an application corresponding to the specified mobile communication network.

11 Claims, 8 Drawing Sheets

(51) Int. Cl.
*H04W 60/00* (2009.01)
*H04M 1/725* (2006.01)

(56) References Cited

U.S. PATENT DOCUMENTS

| | | | |
|---|---|---|---|
| 2009/0016310 A1* | 1/2009 | Rasal | 370/342 |
| 2009/0061853 A1 | 3/2009 | Anschutz | |
| 2010/0099405 A1 | 4/2010 | Brisebois et al. | |

FOREIGN PATENT DOCUMENTS

| | | |
|---|---|---|
| JP | 2009 65282 | 3/2009 |
| JP | 2009 177361 | 8/2009 |

OTHER PUBLICATIONS

Written Opinion of the International Searching Authority issued Dec. 13, 2011, in PCT/JP2011/070759, filed Sep. 12, 2011.

International Search Report Issued Dec. 13, 2011 in PCT/JP11/70759 Filed Sep. 12, 2011.

Combined Office Action and Search Report issued Sep. 17, 2014, in Chinese Patent Application No. 201180045720.4 with English translation.

Office Action issued Jan. 7, 2014 in Japanese Patent Application No. 2010-240549 with English language translation.

Office Action issued Jun. 17, 2014, in Japanese Patent Application No. 2010-240549 with English translation.

Extended European Search Report issued Jul. 27, 2015 in Application No. 11835959.5-1870/2602972 PCT/JP2011070759, 6 pages.

* cited by examiner

Fig.2

| NETWORK INFORMATION | APPLICATIONS TO BE STARTED |
|---|---|
| 440-10 | A,B,C |
| 440-20 | D,E,F |
| 440-00 | G,H |
| ⋮ | ⋮ |
| 208-01 | X,Y,Z |

MOBILE COMMUNICATION TERMINAL AND TERMINAL CONTROL METHOD

TECHNICAL FIELD

The present invention relates to a mobile communication terminal and a terminal control method.

BACKGROUND

Conventionally, the use of mobile communication terminals is restricted only in the mobile communication network of a particular carrier. This restriction is implemented through a technique called SIM lock as described, for example, in Patent Literature 1. The SIM lock is a technique for recognizing only SIM cards from a particular carrier in mobile communication terminals.

CITATION LIST

Patent Literature

[Patent Literature 1] Japanese Patent Application Laid-Open Publication No. 2009-65282

SUMMARY OF INVENTION

Technical Problem

Some applications executed in a mobile communication terminal function in conjunction with only facilities of the mobile communication network of a particular carrier. In other words, such applications function only when the mobile communication terminal performs communication in the mobile communication network of the particular carrier. When the SIM lock function is unlocked from the mobile communication terminal, it is possible to insert SIM cards from an indefinite number of carriers into the mobile communication terminal. Therefore, the mobile communication terminal may perform communication in the mobile communication network of a carrier other than the particular carrier. In this case, the applications described above do not function normally even if they are executed (started) in the mobile communication terminal. The execution of the applications that do not function normally leads to reduction of user's convenience.

The present invention is made in view of the foregoing and aims to provide a mobile communication terminal and a terminal control method in which an application that functions when the mobile communication terminal is performing communication in a particular mobile communication network can be executed appropriately.

Solution to Problem

In order to achieve the object above, a mobile communication terminal according to an embodiment of the present invention includes application execution means for executing one or more applications, location registration means for performing location registration in a mobile communication network for establishing a communication state, communication network specifying means for specifying the mobile communication network in which location registration is made by the location registration means, and application control means for performing control on the application execution means so as to start an application corresponding to the mobile communication network specified by the communication network specifying means.

In the mobile communication terminal according to an embodiment of the present invention, an application corresponding to the mobile communication network in which location registration is performed is started. Therefore, with the mobile communication terminal according to an embodiment of the present invention, an application that functions when communication is being performed in a particular mobile communication network can be executed appropriately.

The application control means may determine an application to be started by referring to correspondence information stored beforehand to indicate correspondence between mobile communication networks and applications. Alternatively, the application may include communication network information specifying a mobile communication network, and the application control means may determine an application to be started by referring to the communication network information included in the application. With such configurations, an application to be started can be determined reliably, and an embodiment of the present invention can be carried out reliably.

The mobile communication terminal may further include location registration control means for selecting a mobile communication network in which location registration is to be performed, in accordance with an application to be started by the application control means upon location registration, and performing control on the location registration means so as to make location registration in the selected mobile communication network. With this configuration, an application can be made available appropriately, thereby improving the user's convenience.

The location registration control means may select a mobile communication network in which location registration is to be performed, in accordance with the number of applications to be started by the control means upon location registration. With this configuration, for example, more applications can be made available, thereby improving the user's convenience.

The location registration control means may select a mobile communication network in which location registration is to be performed, in accordance with a preset priority of an application to be started by the control means upon location registration. With this configuration, for example, an application having a higher priority can be made available, thereby improving the user's convenience.

The application control means may perform control of halting an application other than an application controlled to be started. With this configuration, an application that does not function can be halted, thereby improving the user's convenience and saving resources of the mobile communication terminal.

The application control means may perform control of prohibiting starting of an application other than an application controlled to be started. With this configuration, starting of an application that does not function is prohibited, thereby improving the user's convenience and saving resources of the mobile communication terminal.

The present invention can be described as an invention of a mobile communication terminal as mentioned above and, in addition, may also be described as an invention of a terminal control method as follows. They fall into different categories but are substantially the same invention and achieve similar operation and effects.

Specifically, a terminal control method according to an embodiment of the present invention is performed in a mobile communication terminal including application execution means for executing one or more applications. The terminal control method includes a location registration step of performing location registration in a mobile communication network for establishing a communication state, a communication network specifying step of specifying the mobile communication network in which location registration is made in the location registration step, and an application control step of performing control on the application execution means so as to start an application corresponding to the mobile communication network specified in the communication network specifying step.

Advantageous Effects of Invention

In the mobile communication terminal, an application corresponding to the mobile communication network in which location registration is performed is started, so that an application that functions when communication is being performed in a particular mobile communication network can be executed appropriately.

BRIEF DESCRIPTION OF DRAWINGS

FIG. 2 is a table showing information for use in control by an application control unit.

DESCRIPTION OF EMBODIMENTS

Embodiments of a mobile communication terminal and a terminal control method according to the present invention will be described in details below in conjunction with the figures. It is noted that the same elements are denoted with the same reference signs in the description of the figures, and an overlapping description is omitted. In the following, three embodiments, namely, first to third embodiments will be described.

<First Embodiment>

Figure 1:
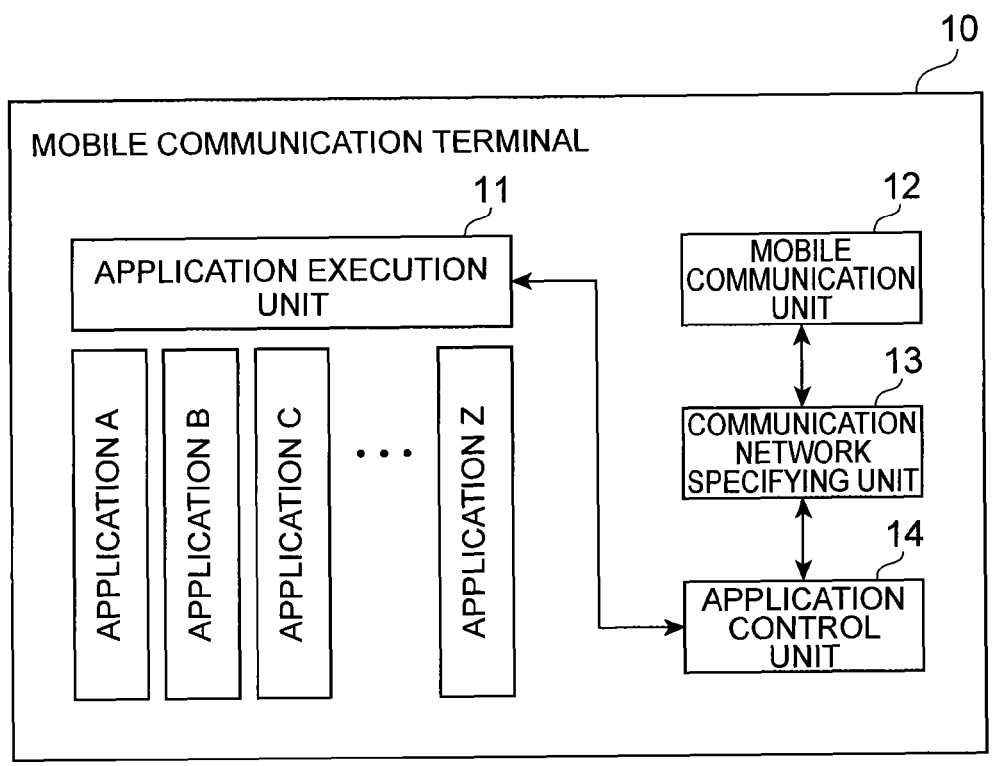
FIG. 1 is a diagram showing a functional configuration of a mobile communication terminal according to a first embodiment of the present invention.

FIG. 1 shows a mobile communication terminal 10 according to the present embodiment. The mobile communication terminal 10 is a device capable of performing cellular mobile communication and specifically corresponds to a mobile phone or the like. The mobile communication terminal 10 performs location registration in a mobile communication network for entering a service area and performs mobile communication with any one base station included in the mobile communication network through a radio communication line.

A SIM (Subscriber Identity Module) card, which is a subscriber authentication module issued from a carrier, is inserted into the mobile communication terminal 10, thereby enabling mobile communication using a mobile communication network provided by the carrier. The mobile communication terminal 10 can perform mobile communication using a mobile communication network corresponding to a SIM card by exchanging SIM cards. That is, the mobile communication terminal 10 can use a plurality of mobile communication networks. The mobile communication terminal 10 may be able to use a plurality of mobile communication networks without requiring exchange of SIM cards.

The mobile communication terminal 10 stores a plurality of applications A to Z. When those applications A to Z are executed in the mobile communication terminal 10, the functions corresponding to the applications A to Z are fulfilled. Those applications A to Z do not function unless the mobile communication terminal 10 uses a particular mobile communication network (unless accessing a particular mobile communication network).

For example, those applications do not function normally unless communication is performed with a server apparatus that can be accessed only through the particular mobile communication network. The particular mobile communication network is determined according to the applications A to Z. Those applications are assigned information specifying the applications, such as IDs (in the present embodiment, "A," "B," ... "Z"), and each can be specified in the mobile communication terminal 10. Applications other than the applications corresponding to the particular mobile communication network (that is, applications not dependent on the mobile communication network) may also be executed in the mobile communication terminal 10 (those applications, however, are not targeted in the present embodiment, and a description thereof is omitted below).

As shown in FIG. 1, the mobile communication terminal 10 is configured to include an application execution unit 11, a mobile communication unit 12, a communication network specifying unit 13, and an application control unit 14. The mobile communication terminal 10 may also include, for example, a function as a mobile phone in addition to the components above.

The application execution unit 11 is application execution means for executing one or more applications stored in the mobile communication terminal 10. Specifically, the application execution unit 11 starts a program of an application stored in the mobile communication terminal 10. The execution of an application by the application execution unit 11 is under the control by the application control unit 14. The starting and termination of an application by the application execution unit 11 can also be performed through the user's operation on the mobile communication terminal 10. In this case, information indicating applications stored in the mobile communication terminal 10 is displayed, for example, in a list so that the user can operate starting of an application. The application execution unit 11 starts the application selected through the user's operation.

The mobile communication unit 12 is means having functions for the mobile communication terminal 10 to perform mobile communication. As one of the functions, the mobile communication unit 12 performs location registration in a mobile communication network for establishing a communication state. That is, the mobile communication unit 12 is location registration means. The location registration is performed on a mobile communication network detected by performing a network search. As a result of the location registration by the mobile communication unit 12, the mobile communication terminal 10 can enter a service area of the mobile communication network in which location registration is performed, and can perform communication in the mobile communication network.

The communication network specifying unit 13 is communication network specifying means for specifying the mobile communication network in which location registration is made by the mobile communication unit 12. Specifically, the communication network specifying unit 13 refers to notification information that is transmitted from the mobile communication network in which location registration is performed, and is received by the mobile communication unit 12. The communication network specifying unit 13 acquires network information, which is communication network information specifying a mobile communication network (PLMN: Public Land Mobile Network), from the notification information. The network information is, for example, a character string composed of a plurality of characters. The communication network specifying unit 13 inputs the acquired network information to the application control unit 14.

The application control unit 14 is application control means for performing control on the application execution unit 11 so as to start an application corresponding to the network information input from the communication network specifying unit 13. Specifically, the application control unit 14 determines an application to be started by referring to correspondence information stored beforehand to indicate the correspondence between mobile communication networks and applications. The correspondence information (correspondence table) indicating the correspondence between mobile communication networks and applications is, for example, information in which network information is associated with information specifying an application to be started, as shown in FIG. 2. For example, this information may be stored in the application control unit 14 simultaneously with installation of applications. The user may be allowed to edit the information above.

By referring to the stored correspondence table shown in FIG. 2, the application control unit 14 controls the application execution unit 11 so as to start an application associated with the network information input from the communication network specifying unit 13. The application may be started at the point in time when location registration is performed by the mobile communication unit 12 (at the point in time when a mobile communication network is specified by the communication network specifying unit 13) or may be started at the time when operation to start is performed by the user. In other words, the application control unit 14 may allow starting of the application corresponding to the mobile communication network in which location registration is performed.

In a case where an application other than the application controlled to be started has been executed in the mobile communication terminal 10, the application control unit 14 may perform control of halting the application. This control is performed on the application execution unit 11. This is to halt an application, for example, in a case where the mobile communication terminal 10 having a function capable of performing communication with a plurality of mobile communication networks has performed communication with another mobile communication network before location registration, and an application that functions only in another mobile communication network has been executed. Alternatively, an application is halted in a case where an application other than the application controlled to be started has been executed through the user's operation.

The application control unit 14 may perform control of prohibiting starting of an application other than the application controlled to be started. This control is performed on the application execution unit 11. When the control of prohibiting starting is performed, an application is not executed even if an instruction to execute the application is performed on the application execution unit 11 through the user's operation or by any other trigger. In conjunction with this control, the application is preferably deleted from the display of the list for operating starting of an application so that the user cannot select the application prohibited from starting. This is to prevent the user from selecting the application that does not function.

Figure 3:
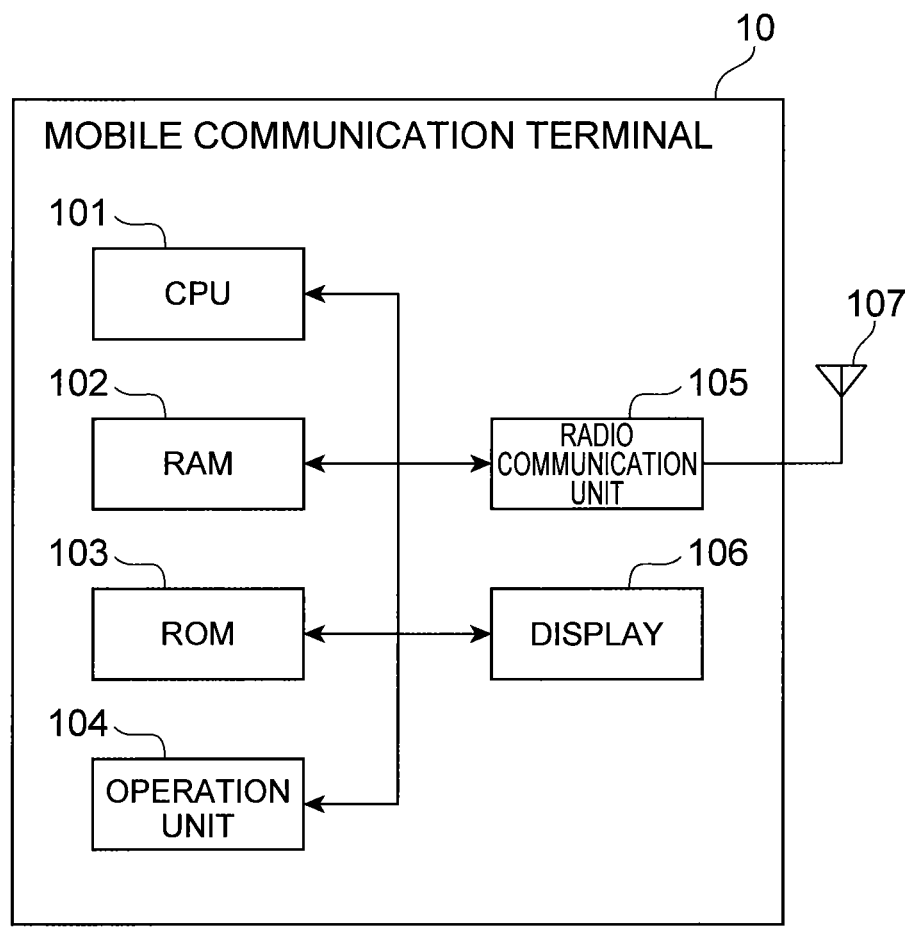
FIG. 3 is a diagram showing a hardware configuration of the mobile communication terminal according to an embodiment of the present invention.

FIG. 3 shows a hardware configuration of the mobile communication terminal 10. As shown in FIG. 3, the mobile communication terminal 10 is configured with hardware including a CPU (Central Processing Unit) 101, a RAM (Random Access Memory) 102 and a ROM 103 (Read Only Memory) as main storages, an operation unit 104, a radio communication unit 105, a display 106, and an antenna 107. These components operate to fulfill each function of the mobile communication terminal 10 as described above.

Figure 4:
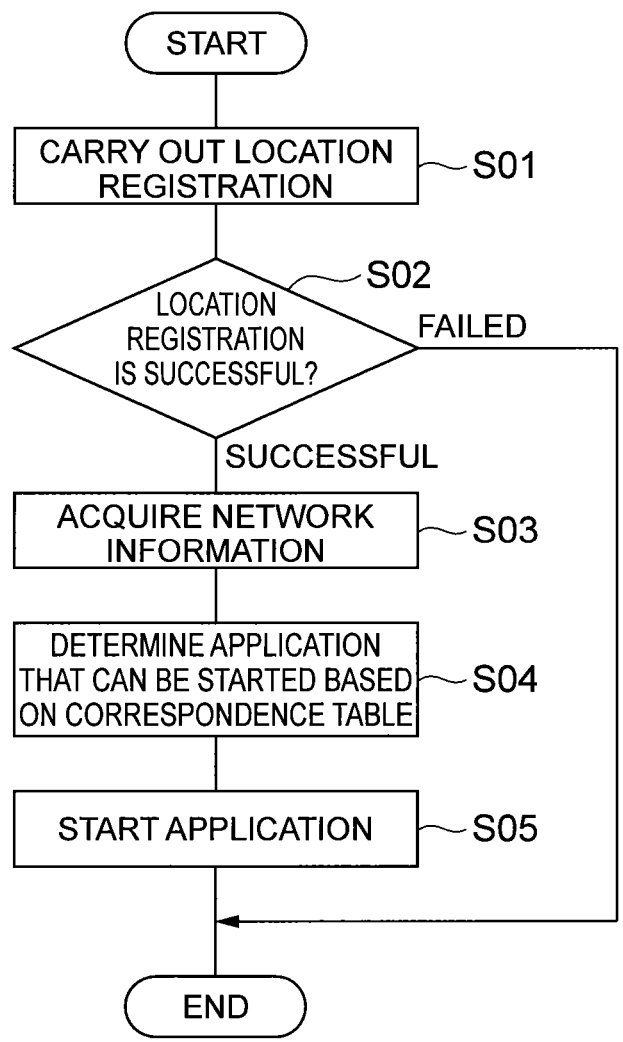
FIG. 4 is a flowchart showing a process (terminal control method) executed in the mobile communication terminal according to the first embodiment of the present invention.

A process (terminal control method) executed in the mobile communication terminal 10 according to the present embodiment will now be described with reference to the flowchart in FIG. 4. This process is performed, for example, when the mobile communication terminal 10 is powered on and enters a service area of a mobile communication network.

In the mobile communication terminal 10, the mobile communication unit 12 performs location registration in a mobile communication network (S01, a location registration step). If the location registration is failed (failed in step S02), no application is started in the mobile communication terminal 10, and the process then ends. Here, the application control unit 14 may perform control of halting an application or prohibiting starting of an application.

If the location registration is successful (successful in step S02), the communication network specifying unit 13 acquires network information specifying the mobile communication network in which location registration is performed (S03, a communication network specifying step). The acquired network information is output from the communication network specifying unit 13 to the application control unit 14.

The application control unit 14 then refers to the correspondence information shown in FIG. 2 and determines that the application associated with the network information input from the communication network specifying unit 13 is the application to be started (S04, an application control step). Then, the application control unit 14 instructs the application execution unit 11 to start the application determined to be started. In accordance with this instruction, the application execution unit 11 starts the application (S05, the application control step).

Accordingly, the user can use the application that functions when communication is being performed in the mobile communication terminal in which location registration is performed, in the mobile communication terminal 10. Here, the application control unit 14 may perform control of halting or prohibiting starting of an application other than the application to be started. The process (terminal control method) executed in the mobile communication terminal 10 according to the present embodiment has been described so far.

As described above, in the present embodiment, an application corresponding to the mobile communication network in which location registration is performed is started. Therefore, according to the present embodiment, an application that functions when communication is being performed in a particular mobile communication network can be executed appropriately.

If an application to be started is determined by referring to the correspondence information shown in FIG. 2 as in the present embodiment, the application to be started can be determined reliably, and an embodiment of the present invention can be carried out reliably.

As in the present embodiment, control may be performed such that an application other than the application to be started is halted or prohibited from starting. With such configurations, execution of an application that does not function can be prevented. This can avoid the user from selecting an application that does not function, and can improve the user's convenience. In addition, consumption of resources of the mobile communication terminal by an application that does not function appropriately can be prevented, thereby saving resources of the mobile communication terminal.

<Second Embodiment>

Figure 5:
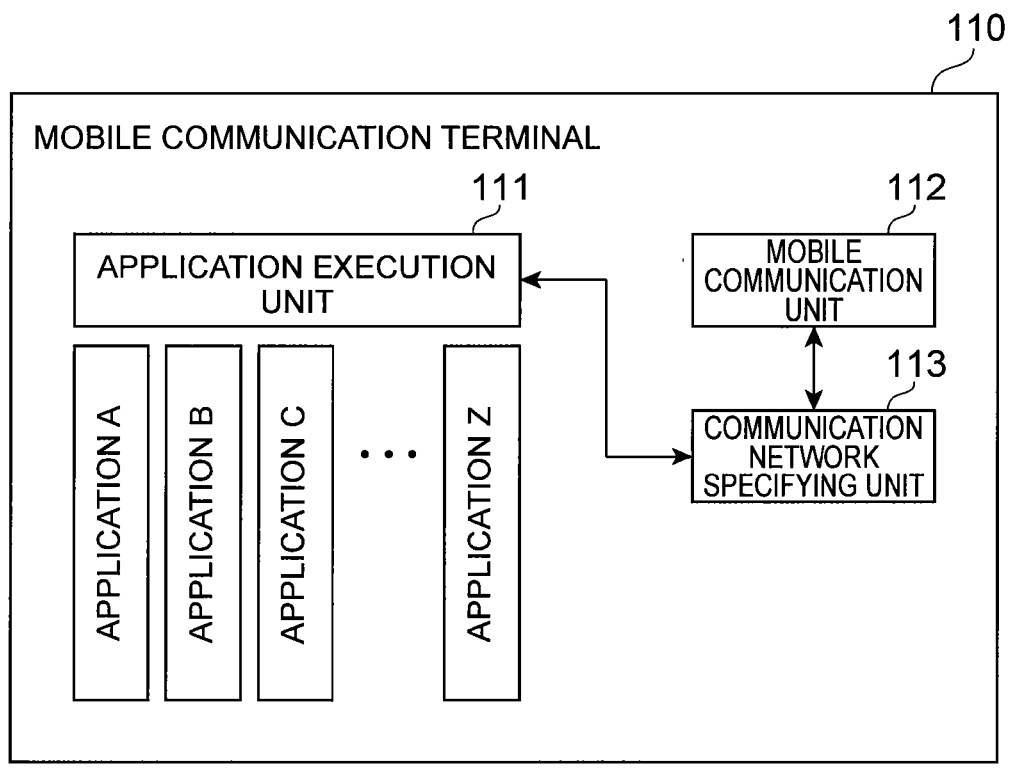
FIG. 5 is a diagram showing a functional configuration of a mobile communication terminal according to a second embodiment of the present invention.

FIG. 5 shows a mobile communication terminal 110 according to the present embodiment. The basic configuration of the mobile communication terminal 110 is similar to that of the mobile communication terminal 10 shown in the first embodiment. The mobile communication terminal 110 is similar to the mobile communication terminal 10 in that it is concerned with control of execution of an application that does not function without using a particular mobile communion network, but is different in a method of control as described below. In the following description, the difference from the mobile communication terminal 10 is mainly described.

As shown in FIG. 5, the mobile communication terminal 110 is configured to include an application execution unit 111, a mobile communication unit 112, and a communication network specifying unit 113.

The application execution unit 111 is application execution means for executing one or more applications stored in the mobile communication terminal 10. The application execution unit 111 has a configuration similar to the application execution unit 11 in the first embodiment but is not under the control of the application control unit 14. In the present embodiment, the application executed by the application execution unit 111 determines whether to start and the like, per se. The details will be described later.

The mobile communication unit 112 has a configuration similar to the mobile communication unit 12 in the first embodiment. The communication network specifying unit 113 has a configuration similar to the communication network specifying unit 13 in the first embodiment. The communication network specifying unit 113 inputs the acquired network information to the application execution unit 111.

The control of execution of an application in the present embodiment is performed as follows. The application executed by the application execution unit 111 includes (holds) network information specifying a mobile communication network. The mobile communication network indicated by the network information held by the application is a mobile communication network in which the application functions appropriately when the mobile communication terminal 110 is present in a service area.

The application executed by the application execution unit 111 determines whether to start itself, by referring to the network information included in itself. In other words, the application executed by the application execution unit 111 is application control means per se.

When the network information is input to the application execution unit 111 from the communication network specifying unit 113, each application compares the input network information with the network information included in itself. If they agree, the application starts autonomously. If they do not agree, the application does not start. The starting referred to here means bringing about a state in which the function of the application is fulfilled. The comparison above is actually performed in a state in which the application is started, wherein only a module for performing comparison and control of starting is executed.

As in the first embodiment, the application may be started at a point in time when location registration is performed by the mobile communication unit 112 (at a point in time when the mobile communication network is specified by the communication network specifying unit 113), or may be started at the time when operation to start is performed by the user. In other words, each application is set such that the application corresponding to the mobile communication network in which location registration is performed can be started.

The application may perform control of halting itself when the input network information does not agree with the network information included in itself and when the application itself has already been executed. The application may perform control of prohibiting itself from starting when the input network information does not agree with the network information included in itself. In conjunction with this control, the application is preferably deleted from the display of the list for operating starting of an application so that the user cannot select the application prohibited from starting.

Figure 6:
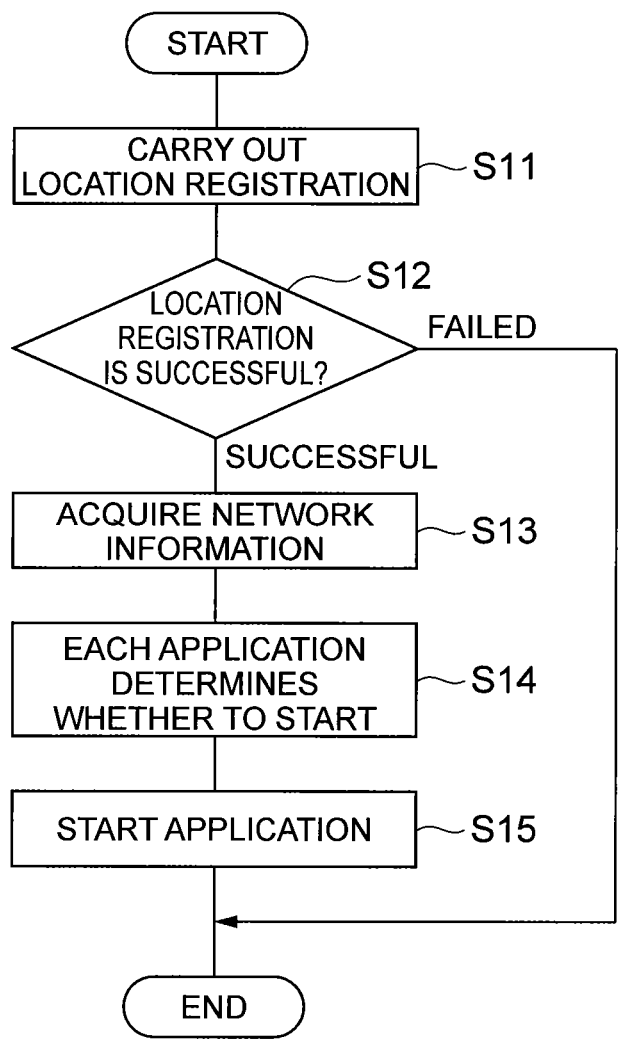
FIG. 6 is a flowchart showing a process (terminal control method) executed in the mobile communication terminal according to the second embodiment of the present invention.

A process (terminal control method) executed in the mobile communication terminal 110 according to the present embodiment will now be described with reference to the flowchart in FIG. 6. This process is performed, for example, when the mobile communication terminal 110 is powered on and enters a service area of a mobile communication network.

In the mobile communication terminal 110, the mobile communication unit 112 performs location registration in a mobile communication network (S11, the location registration step). If the location registration is failed (failed in S12), no application is started in the mobile communication terminal 110, and the process then ends. Here, each application may perform control of halting an application or prohibiting starting of an application.

If the location registration is successful (successful in S12), the communication network specifying unit 113 acquires network information specifying the mobile communication network in which location registration is performed (S13, the communication network specifying step). The acquired network information is output from the communication network specifying unit 113 to the application execution unit 111.

Then, each application executed by the application execution unit 111 determines whether the network information input from the communication network specifying unit 113 agrees with the network information included itself. If agree, it is determined that the application itself is an application to be started (S14, the application control step). If not agree, it is determined that the application itself is an application not to be started. The application determined to be started starts autonomously (S15, the application control step).

Accordingly, the user can use an application that functions when communication is being performed in the mobile communication terminal in which location registration is performed, in the mobile communication terminal 110. As for the application determined not to be started, control of halting or prohibiting starting may be performed autonomously. The process (terminal control method) executed in the mobile communication terminal 110 according to the present embodiment has been described so far.

As described above, in the present embodiment, an application corresponding to the mobile communication network in which location registration is performed is started. Therefore, also in the present embodiment, an application that functions when communication is being performed in a particular mobile communication network can be executed appropriately.

As in the present embodiment, if network information is embedded in an application so that the control of starting can be performed autonomously, the application provider side can allow control to be performed appropriately.

<Third Embodiment>

Figure 7:
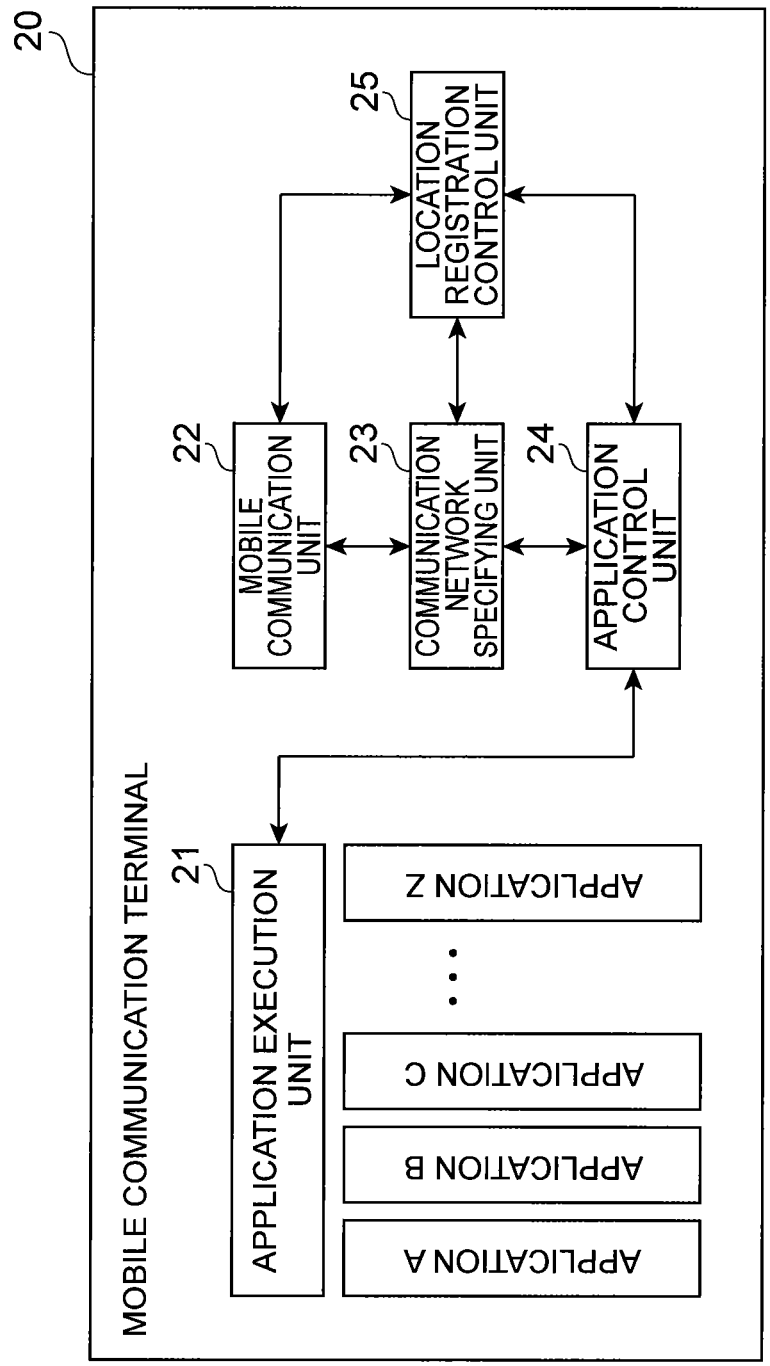
FIG. 7 is a diagram showing a functional configuration of a mobile communication terminal according to a third embodiment of the present invention.

FIG. 7 shows a mobile communication terminal 20 according to the present embodiment. The basic configuration of the mobile communication terminal 20 is similar to that of the mobile communication terminal 10 and the mobile communication terminal 110 shown in the first and the second embodiments, respectively. The mobile communication terminal 20 selects one mobile communication network from a plurality of mobile communication networks and performs communication in the selected mobile communication network. With the functions of the mobile communication terminal 10 and the mobile communication terminal 110 as described above as preconditions, the mobile communication terminal 20 according to the present embodiment has a function for selecting a mobile communication network to perform communication (to enter a service area) from a plurality of mobile communication terminals. In the following description, the difference from the mobile communication terminal 10 will be mainly described based on the mobile communication terminal 10. However, the mobile communication terminal 20 may configured based on the mobile communication terminal 110.

As shown in FIG. 7, the mobile communication terminal 20 is configured to include an application execution unit 21, a mobile communication unit 22, a communication network specifying unit 23, an application control unit 24, and a location registration control unit 25.

The application execution unit 21 has a configuration similar to the application execution unit 11 in the first embodiment.

The mobile communication unit 22 has a configuration similar to the mobile communication unit 12 in the first embodiment. The mobile communication unit 22 receives notification information from a mobile communication network in which location registration is possible as detected by performing a network search. The mobile communication unit 22 performs location registration in the mobile communication network selected by the location registration control unit 25.

The communication network specifying unit 23 has a configuration similar to the communication network specifying unit 13 in the first embodiment. The communication network specifying unit 23 inputs the acquired network information to the application control unit 24. The communication network specifying unit 23 acquires network information from the notification information received by the mobile communication unit 22 from the mobile communication network in which location registration is possible. The communication network specifying unit 23 outputs to the location registration control unit 25 the acquired network information of the mobile communication network in which location registration is possible.

The application control unit 24 has a configuration similar to the application control unit 14 in the first embodiment. The correspondence information stored in the application control unit 24 to indicate the correspondence between mobile communication networks and applications as shown in FIG. 2 is referred to by the location registration control unit 25.

The location registration control unit 25 is location registration control means for selecting a mobile communication network in which location registration is to be performed, in accordance with an application to be started by the application control unit 24 upon location registration, and performing control on the mobile communication unit 22 so as to make location registration in the selected mobile communication network. By referring to the information input from the communication network specifying unit 23, the location registration control unit 25 selects a mobile communication network in which location registration is to be performed, from among the mobile communication networks in which location registration is possible.

Specifically, the location registration control unit 25 selects a mobile communication network in which location registration is to be performed, in accordance with the number of applications to be started by the application control unit 24 upon location registration. By referring to the correspondence information shown in FIG. 2 stored in the application control unit 24, the location registration control unit 25 selects a mobile communication network having the largest number of applications to be started, as a mobile communication network in which location registration is to be performed, from among the mobile communication networks in which location registration is possible.

Alternatively, priorities may be set for applications to be started by the application control unit 24, so that the location registration control unit 25 selects a mobile communication network in which location registration is to be performed, according to the priorities. For example, the priorities may be registered by the user as a user's priority application list and stored in the location registration control unit 25. By referring to the user's priority application list, the location registration control unit 25 selects, as a mobile communication network in which location registration is to be performed, a mobile communication network in which an application to be started best matches the list among mobile communication networks in which location registration is possible. Specifically, for example, a mobile communication network in which an application with the highest priority is to be started is selected. Alternatively, a mobile communication network in which location registration is to be performed may be selected by combining the number of applications to be started with the priorities.

Figure 8:
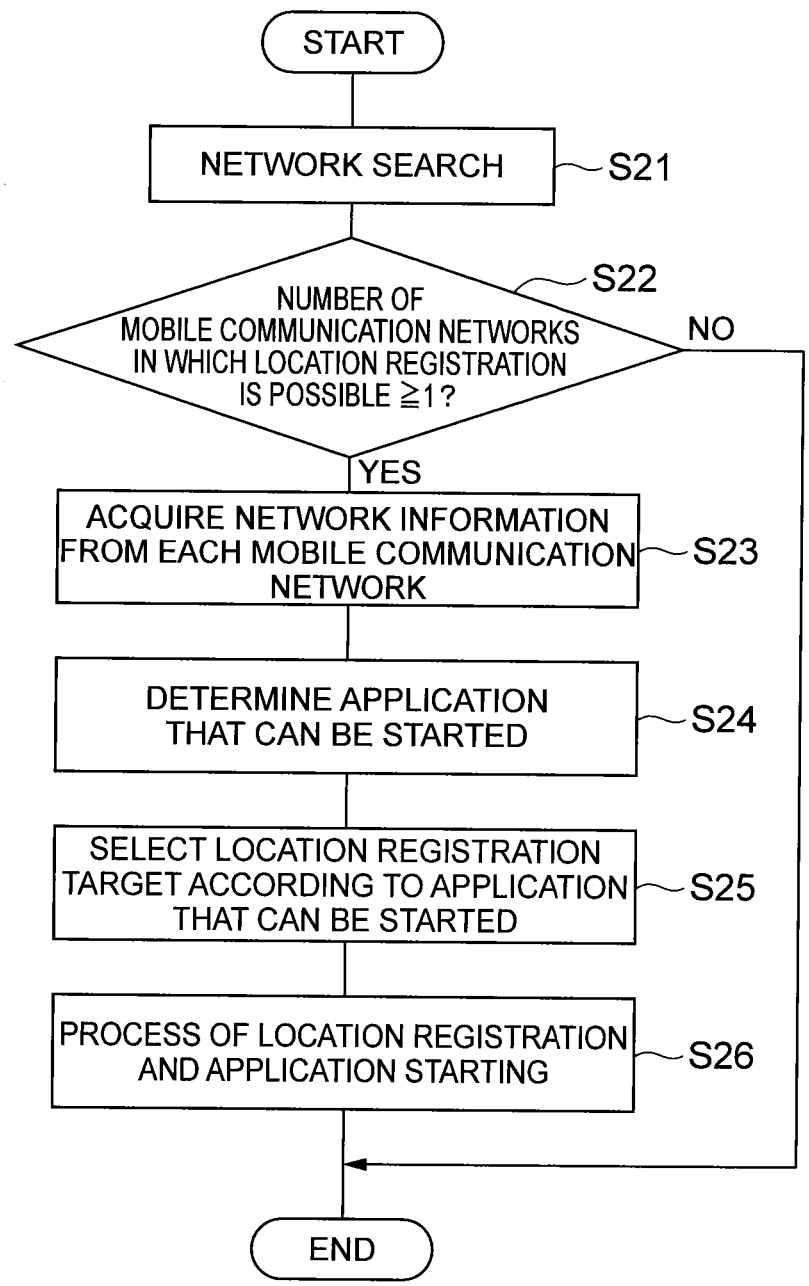
FIG. 8 is a flowchart showing a process (terminal control method) executed in the mobile communication terminal according to the third embodiment of the present invention.

A process (terminal control method) executed in the mobile communication terminal 20 according to the present embodiment will now be described with reference to the flowchart in FIG. 8. This process is performed, for example, when the mobile communication terminal 20 is powered on and enters a service area of a mobile communication network.

In the mobile communication terminal 20, the mobile communication unit 22 conducts a network search to detect a mobile communication network in which location registration is possible (S21). If no mobile communication network in which location registration is possible is found as a result of the network search (NO in S22), no application is started in the mobile communication terminal 20, and the process then ends. Here, the application control unit 24 may perform control of halting an application or prohibiting starting of an application.

If one or more mobile communication networks in which location registration is possible are found as a result of the network search (YES in S22), the communication network specifying unit 23 acquires network information specifying the mobile communication networks in which location registration is possible (S23). The acquired network information is output from the communication network specifying unit 23 to the location registration control unit 25.

Then, the location registration control unit 25 refers to the correspondence information shown in FIG. 2 and determines an application to be started for each mobile communication network in which location registration is possible (S24, a location registration control step). The location registration control unit 25 then selects a mobile communication network in which location registration is to be performed, from the mobile communication networks in which location registration is possible, in accordance with the number of applications to be started or the priorities among the applications that can be started (S25, the location registration control step). The location registration control unit 25 instructs the mobile communication unit 22 to make location registration in the selected mobile communication network.

Then, location registration is performed by mobile communication unit 22 in the mobile communication network selected by the location registration control unit 25, and a process of starting the corresponding application is performed (S26). This process (S26) is performed in a similar manner as in the process shown in the flowchart in FIG. 3. The process (terminal control method) executed in the mobile communication terminal 20 according to the present embodiment has been described so far.

According to the present embodiment, an application that functions when communication is being performed in a particular mobile communication network can be made available appropriately, thereby improving the user's convenience. As described above, if a mobile communication network in which location registration is to be performed is selected according to the number of applications, for example, more applications can be made available, thereby improving the user's convenience. If a mobile communication network in which location registration is to be performed is selected according to the priorities of applications, for example, an application having a higher priority can be made available, thereby improving the user's convenience.

In the foregoing embodiment, the available application is determined by referring to the correspondence information shown in FIG. 2. However, when the network information is included in the application as in the second embodiment, the determination may be made by referring to the network information included in the application.

REFERENCE SIGNS LIST 10, 110, 20 . . . mobile communication terminal, 11, 111, 21 . . . application execution unit, 12, 112, 22 . . . mobile communication unit, 13, 113, 23 . . . communication network specifying unit, 14, 24 . . . application control unit, 25 . . . location registration control unit, 101 . . . CPU, 102 . . . RAM, 103 . . . ROM, 104 . . . operation unit, 105 . . . radio communication unit, 106 . . . display, 107 . . . antenna.

The invention claimed is:

1. A mobile communication terminal comprising:
   circuitry configured to
   select a mobile communication network in which location registration is to be performed to maximize a total number of applications capable of being started upon location registration;
   perform location registration in the selected mobile communication network;
   determine an application to be started in accordance with the mobile communication network in which the location registration is made; and
   start the application to be started in accordance with the mobile communication network in which the location registration is made.

2. The mobile communication terminal according to claim 1, wherein
   the circuitry is configured to determine the application to be started by referring to correspondence information stored prior to performing the location registration and indicating a correspondence between mobile communication networks and applications.

3. The mobile communication terminal according to claim 1, wherein
   the application to be started includes communication network information specifying the mobile communication network, and
   the circuitry is configured to determine the application to be started by referring to the communication network information included in the application.

4. The mobile communication terminal according to claim 1, wherein
   the circuitry is configured to perform control to halt an application other than the application to be started.

5. The mobile communication terminal according to claim 1, wherein
   the circuitry is configured to perform control to prohibit starting an application other than the application to be started.

6. The mobile communication terminal according to claim 1, wherein
   the circuitry is configured to determine the application to be started by referring to stored correspondence information associating each of a plurality of mobile communication networks with a respective one of the one or more applications.

7. A terminal control method performed in a mobile communication terminal configured to execute one or more applications, the terminal control method comprising:
   selecting a mobile communication network in which location registration is to be performed to maximize a total number of applications capable of being started upon location registration;
   performing location registration in the selected mobile communication network;
   determining an application to be started in accordance with the mobile communication network in which the location registration is made; and
   starting the application to be started in accordance with the mobile communication network in which the location registration is made.

8. The mobile communication terminal according to claim 1, wherein
   the circuitry is configured to acquire information identifying each of a plurality of mobile communication networks to which location registration may be performed.

9. The mobile communication terminal according to claim 8, wherein
   the circuitry is configured to identify a total number of applications capable of being started upon location registration to each of the plurality of mobile communication networks by accessing a table associating identification information corresponding to each of the plurality of mobile communication networks with identification information corresponding to applications capable of being started upon location registration to each of the plurality of mobile communication networks.

10. The mobile communication terminal according to claim 9, wherein the circuitry is configured to select the mobile communication network in which location registration is to be performed by selecting the mobile communication network having a maximum total number of applications capable of being started upon location registration based on the identifying.

11. The mobile communication terminal according to claim 8, wherein the information identifying each of the plurality of mobile communication networks is a Public Land Mobile Network (PLMN) identifier, and the circuitry is configured to identify a total number of applications capable of being started upon location registration to each of the plurality of mobile communication networks by accessing a table associating each PLMN identifier with identification information corresponding to each application that is capable of being started.

* * * * *